(12) United States Patent
Takamori

(10) Patent No.: US 6,203,462 B1
(45) Date of Patent: Mar. 20, 2001

(54) SPROCKET

(75) Inventor: Norihiko Takamori, Kyoto (JP)

(73) Assignees: Sunstar Giken Kabushiki Kaisha, Osaka (JP); Uni-Sunstar B.V., Amsterdam (NL)

( * ) Notice: Subject to any disclaimer, the term of this patent is extended or adjusted under 35 U.S.C. 154(b) by 0 days.

(21) Appl. No.: 09/230,867

(22) PCT Filed: Aug. 13, 1997

(86) PCT No.: PCT/JP97/02824

§ 371 Date: Jul. 6, 1999

§ 102(e) Date: Jul. 6, 1999

(87) PCT Pub. No.: WO98/06962

PCT Pub. Date: Feb. 19, 1998

(30) Foreign Application Priority Data

Aug. 14, 1996 (JP) .................................... 8-214529

(51) Int. Cl.[7] ........................... F16H 55/06; F16H 55/30; F16H 7/06
(52) U.S. Cl. ........................ 474/161; 474/156; 474/160
(58) Field of Search ....................... 474/162, 160, 474/156, 158, 163, 56, 50, 152, 154, 161, 151

(56) References Cited

U.S. PATENT DOCUMENTS

| | | | |
|---|---|---|---|
| 2,374,644 | * | 5/1945 | Bombardier ..................... 474/161 |
| 3,448,629 | * | 6/1969 | Pfrank et al. ..................... 474/156 X |
| 4,227,422 | * | 10/1980 | Kawashima et al. ............... 474/156 |
| 4,261,214 | * | 4/1981 | Watanabe et al. ................. 474/156 |
| 4,559,028 | * | 12/1985 | Reeves, Jr. ....................... 474/162 |
| 5,224,903 | * | 7/1993 | Langhof et al. ................... 474/161 X |
| 5,984,817 | * | 11/1999 | Shulz ................................ 474/156 |

FOREIGN PATENT DOCUMENTS

| | | | |
|---|---|---|---|
| 2816137 | * | 10/1979 | (DE) . |
| 2126554 | * | 3/1984 | (GB) . |
| 2545902 | * | 3/1984 | (FR) . |

OTHER PUBLICATIONS

Japanese Industrial Standard, JIS B 1801 "Short–pitch Transmission Precision Roller Chains and Bush Chains", 1997, with attached English translation.

* cited by examiner

Primary Examiner—David A. Bucci
Assistant Examiner—Marcus Charles
(74) Attorney, Agent, or Firm—Wenderoth, Lind, & Ponack, L.L.P.

(57) ABSTRACT

A sprocket 1 includes a wavy region 2. The wavy region is formed at least at the outer periphery of the sprocket and extends in an undulating fashion along the circumference of the sprocket. The wavy region has a plurality of convex joint portions 3. A plurality of teeth 5 are formed at the outer end of the convex joint portions.

29 Claims, 22 Drawing Sheets

SPROCKET

TECHNICAL FIELD

The present invention relates to a sprocket associated with a chain in a power transmission system to transmit power.

BACKGROUND ART

A combination of a chain and sprocket as a power transmission system is widely employed in a motorcycle, bicycle or other various industrial machines. The shape and size of the chain and sprocket are defined in JISB1801 and JISB1802 of the Japan Industrial Standards.

To reduce the amount of material or the production cost, or to reduce the weight of a motorcycle and improve response during acceleration, a predetermined pattern of weight reduction holes are formed in the sprocket. A sprocket which is mounted on a rear wheel of a motorcycle is, in many cases, exposed to ambient atmosphere. Such holes have an effect on the aesthetics of the motorcycle. To this end, there have been proposed holes of various shapes and sizes.

As mentioned above, such holes are effective for reducing the weight of the sprocket to some extent. The holes can not, however, be formed at the outer periphery of the sprocket since it is necessary to maintain the strength and rigidity of the teeth. Thus, a further reduction in the weight of the sprocket is not possible. It should be noted that to improve response during acceleration, it is preferable to reduce the weight of the outer periphery of the sprocket. However, the weight of the outer periphery of the sprocket can not be reduced by the holes as mentioned above.

A chain is typically composed of two pin link plates and roller link plates extending parallel to each other and arranged in an alternate fashion, and mechanically connected by pins. This arrangement inevitably places limits on tensile strength. As such, the use of a narrower chain creates a problem as to strength. In contrast, the sprocket has no mechanical connection. Various materials have recently been proposed to increase the strength and rigidity of a sprocket. A sprocket made of such materials enjoys the same strength and rigidity if the thickness is reduced by one-half that of a conventional sprocket.

There may be employed a combination of a thin and lightweight sprocket and a conventional chain with a sufficient degree of strength. Such a combination may, however, create rattling in the thickness direction of the sprocket. Such vibration or rattling, it occurs, results in improper engagement of the sprocket with the chain, produces noise, and causes irregular wear of the sprocket and the chain and twisting of the sprocket and chain due to application of uneven loads.

It is, therefore, an object of the present invention to provide a sprocket which is thin, but enables smooth engagement of the sprocket with an associated chain, which provides a sufficient degree of torsional strength, and which has an aesthetically pleasing appearance.

SUMMARY OF THE INVENTION

According to one aspect of the present invention, there is provided a sprocket comprising a wavy region formed at least at its outer periphery, and a plurality of teeth. The wavy region extends in an undulating fashion along the circumference of the sprocket and includes a plurality of convex joint portions. The teeth are formed at least at the outer end of the wavy region.

In its preferred form, the sprocket includes a central opening. The wavy region extends between the central opening and the outer periphery of the sprocket. The wavy region may also be located only at or near the outer periphery of the sprocket.

In its preferred form, the sprocket includes a plurality of holes adapted to reduce the weight of the sprocket. The holes are circular in shape, or may be oblong in shape. The sprocket has a central opening, and the holes are connected to the central opening.

In its preferred form, the convex joint portions extend radially of the sprocket. Alternatively, the convex joint portions are inclined relative to the radial direction of the sprocket. The convex joint portions may be curved, may have flat surfaces, or may be bent.

In its preferred form, the teeth are in the form of flat plates. A pitch between one pair of adjacent convex joint portions is different from a pitch between the other pairs of adjacent convex joint portions.

The teeth are formed at the outer end of the convex joint portions or slant portions between adjacent convex joint portions.

According to another aspect of the present invention, there is provided a sprocket comprising an annular wavy region formed at least at its outer periphery, and a plurality of teeth. The wavy region extends in an undulating fashion in a direction radially of the sprocket. The teeth are formed at the outer periphery of the wavy region.

According to a further aspect of the present invention, there is provided a sprocket comprising thick and thin portions formed at its outer periphery and arranged alternately along the circumference of the sprocket, and a plurality of teeth are formed at the outer end of the wavy region.

In its preferred form, there is provided a means for reducing noise arising from contact between the sprocket and an associated chain. The means for reducing noise is mounted to roots formed between adjacent teeth, and may comprise a cushion element. The means for reducing noise may also comprise an annular resilient element and may extend along the teeth so as to position part of the resilient element in the roots. The means for reducing noise may also extend over the roots, or may be located in part of the roots, located adjacent to the roots, located radially outwardly of the roots, located at one side of the roots, or located at opposite sides of the roots.

In its preferred form, the means for reducing noise comprises cushion elements, and the sprocket includes through-holes adjacent to the roots. The cushion elements extend through the through-holes and are interconnected so that the cushion elements are disposed along the roots.

The sprocket according to the present invention comprises a wavy region formed at least at its outer periphery, and a plurality of teeth. The wavy region extends in an undulating fashion along the circumference of the sprocket and includes a plurality of convex joint portions. The teeth are formed at least at the outer end of the convex joint portions. The teeth of the sprocket are engaged with opposite sides of chain rollers so as to constantly provide an appropriate amount of axial play between the sprocket and a chain. The wavy region enables a reduction in the thickness of the sprocket. The teeth of such a thin sprocket appear to have a nominal thickness identical to those of a typical sprocket and can thus be maintained in proper engagement with an associated chain. Also, the wavy region provides a higher degree of torsional strength and rigidity to the entire sprocket. Advantageously, the wavy region promotes the flow of air during rotation of the sprocket so as to prevent an increase in the temperature of the sprocket. As the sprocket is rotated, the resulting centrifugal force causes mud and other foreign substances, which may be attached to the outer surface of the sprocket during use, to be moved to a part where the sprocket is engaged with the chain. The wavy region, formed at least at the outer periphery of the sprocket, is effective for allowing such mud to flow along the grooves of the wavy region and then out of the sprocket. Thus, the sprocket is substantially free from mud and other foreign substances.

In the sprocket, one pitch between adjacent convex joint portions may be different from the other pitches between the other convex joint portions. With this arrangement, an odd number of teeth can be formed by providing an odd number of convex joint portions.

The sprocket according to the present invention comprises an annular wavy region formed at least at its outer periphery, and a plurality of teeth. The wavy region extends in an undulating fashion in a direction radially of the sprocket. The teeth are formed at the outer periphery of the wavy region. This arrangement provides an appropriate amount of axial play between the sprocket and the chain. The wavy region which is formed at least at the outer periphery of the sprocket enables a reduction in the thickness of the sprocket. The distance between adjacent convex joint portions of such a thin sprocket is, however, identical to the thickness of the teeth of a typical sprocket. Thus, the sprocket is maintained in proper engagement with the chain. The wavy region also provides a higher degree of torsional strength and rigidity to the entire sprocket. Advantageously, the wavy region promotes the flow of air during rotation of the sprocket so as to prevent an increase in the temperature of the sprocket. As the sprocket is rotated, the resulting centrifugal force causes mud and other foreign substances, which may be attached to the outer surface of the sprocket during use, to be moved to a part where the sprocket is engaged with an associated chain. The wavy region, formed at least at the outer periphery of the sprocket, is effective to allow such mud to flow along the grooves of the wavy region and then out of the sprocket. Thus, the sprocket is substantially free from mud and other foreign substances.

The sprocket according to the present invention comprises thick and thin portions formed at its outer periphery and arranged alternately along the circumference of the sprocket, and a plurality of teeth formed at the outer end of the thick portions. This arrangement provides an appropriate amount of axial play between the sprocket and an associated chain. The thick portions are capable of maintaining proper engagement of the sprocket with the chain while the thin portions enable a reduction in the weight of the sprocket. The alternate arrangement of the thin and thick portions provides a sufficient degree of torsional strength and rigidity to the entire sprocket. Mud and other foreign substances are caused to flow along the grooves of the wavy region and out of the sprocket. Thus, the sprocket is substantially free from mud.

DETAILED DESCRIPTION OF THE INVENTION

Figure 1:
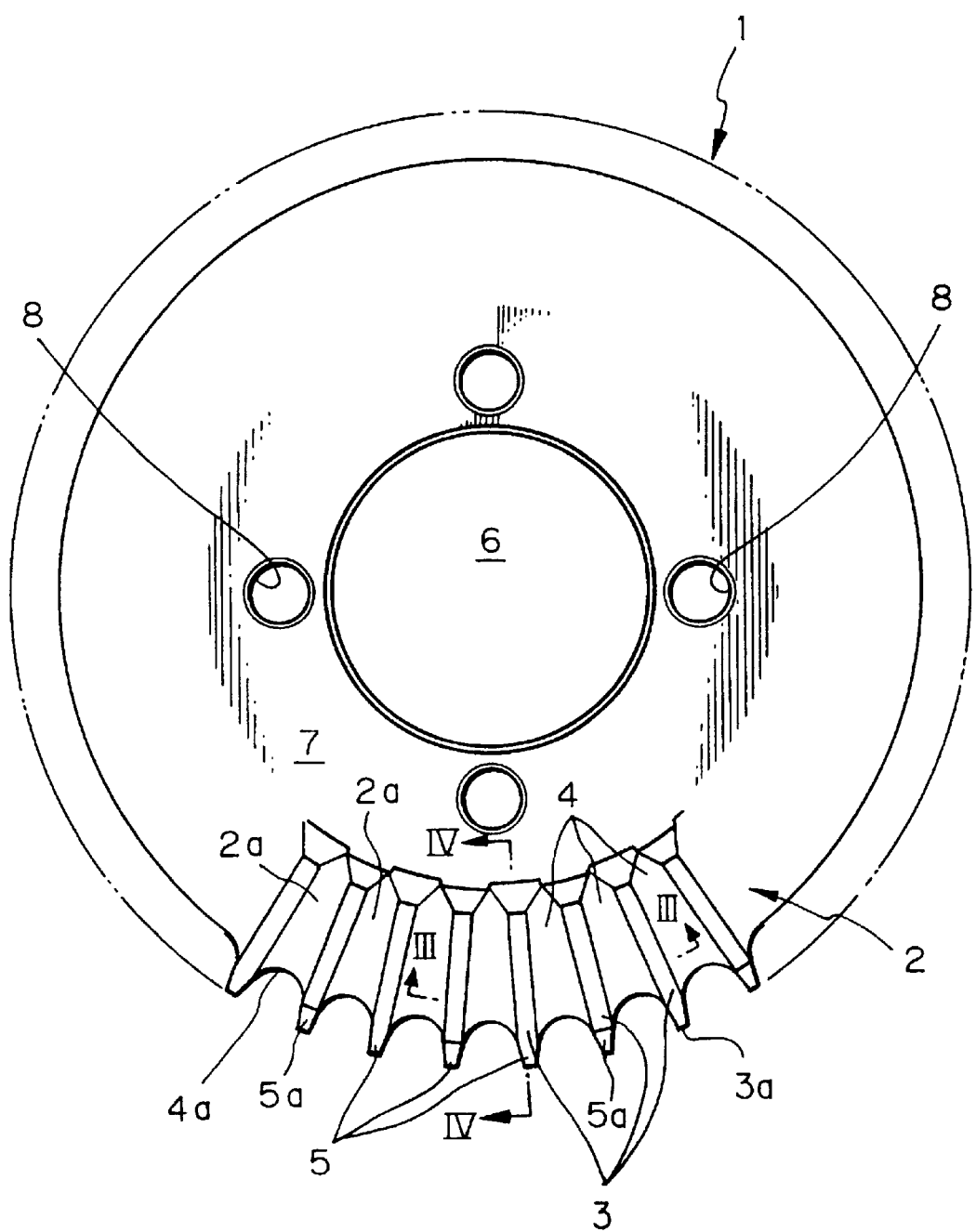
FIG. 1 is a front view of a sprocket according to the present invention.
Figure 2:
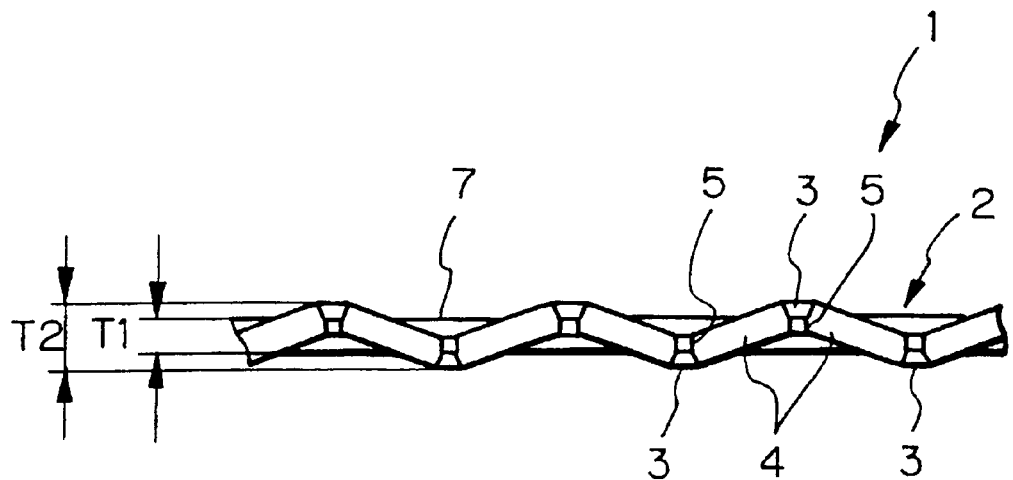
FIG. 2 is a view showing the teeth of the sprocket.
Figure 3:
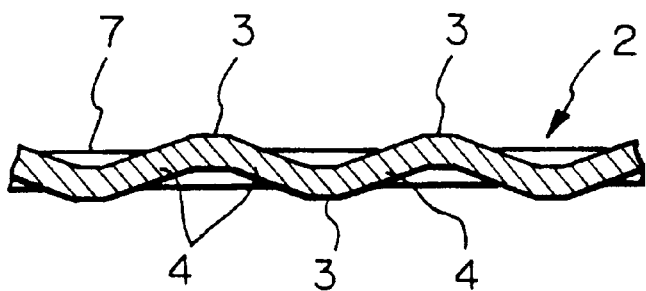
FIG. 3 is a sectional view taken on the line III—III in FIG. 1.
Figure 4:
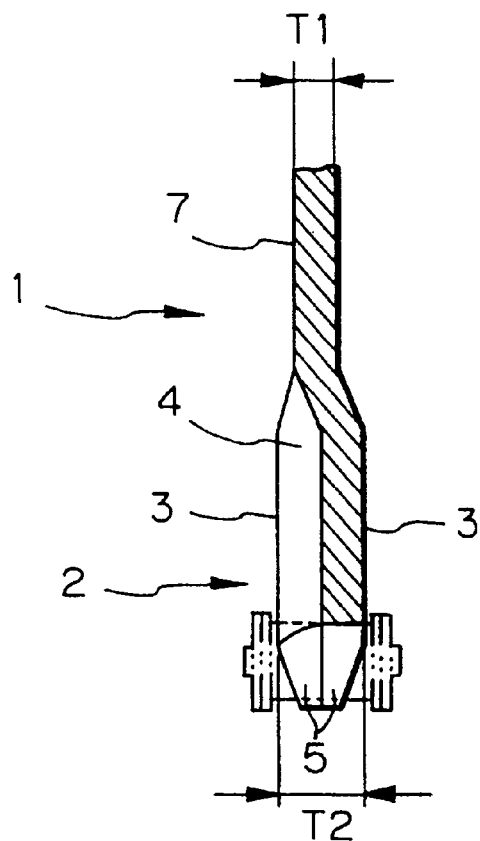
FIG. 4 is a sectional view taken on the line IV—IV in FIG. 1.

The present invention will now be described, by way of example, with reference to the drawings.

Referring to FIGS. 1 to 4, a sprocket 1 is made by pressing a disc-shaped member by a press machine. Various portions of the sprocket are substantially identical in thickness. Further, the sprocket may be made by a forging technique.

The sprocket 1 includes a wavy region 2. The wavy region 2 extends from the outer periphery toward the center of the sprocket 1 by approximately one-third of the radius of the sprocket 1 and is arranged, with a fixed pitch, in an undulating fashion along the circumference of the sprocket 1. The wavy region 2 has opposite convex joint portions 3 and slant portions 4 between adjacent convex joint portions 3. The wavy region 2 includes a plurality of teeth 5. The teeth 5 include crests 3a located at the outer end of the convex joint portions 3 and roots 4a located at the outer end of the slant portions 4. The top of each of the teeth 5 is beveled to provide a chamfer 5a. The sprocket 1 has a thickness T1 which is in a range between $\frac{1}{5}$ and $\frac{4}{5}$ of the axial distance T2 between the tops of adjacent teeth 5. If the distance T2 is equal to or greater than $\frac{4}{5}$ of the distance T2, the sprocket 1 can not be sufficiently reduced in weight. If, on the other hand, the thickness T1 is equal to or less than $\frac{1}{5}$ of the distance T2, the sprocket 1 can not be given a sufficient degree of strength. If the strength of the sprocket 1 does not need to be considered, the thickness T1 may be in the range between $\frac{1}{10}$ and $\frac{4}{5}$. Illustratively, the thickness T1 is approximately ½ of the distance T2. The sprocket 1 would be substantially identical in cross-section to a conventional sprocket if two of the sprockets 1 were displaced in a circumferential direction and superimposed together.

The sprocket 1 has a central opening 6. The sprocket 1 includes an annular body 7 between the wavy region 2 and the central opening 6. Four holes 8 are formed in the annular body 7 in a circumferentially equally spaced relationship. The shaft of a rear wheel, for example, of a motorcycle is inserted through the central opening 6 of the sprocket 1. Four bolts are inserted through the corresponding holes 8 so as to secure the annular body 7 to the flange of that shaft. Any number of holes 8, for example, 3, 5, 6 or 8 holes, may be formed in the annular body 7 of the sprocket 1.

The axial center of the wavy region 2 is located in the same plane as the axial center of the annular body 7. Alternatively, one side of the annular body 7 may be located in the same plane as one of the opposite convex joint portions of the wavy region 2.

Reference will next be made to the operation and advantages of the sprocket 1.

Figure 5:
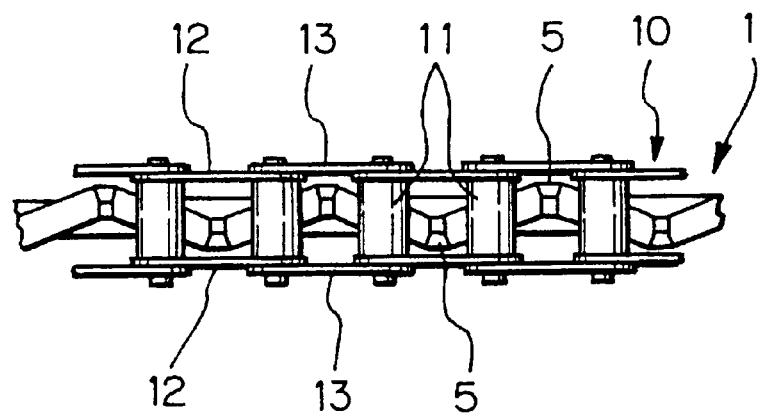
FIG. 5 is a view showing the manner in which the teeth are engaged with an associated chain.

As shown in FIG. 5, a chain 10 extends around the sprocket 1 so that the teeth 5 are alternately engaged with opposite ends of each roller 11. A clearance is left between the teeth 5 and roller link plates 12 and pin link plates 13 so as to insure proper engagement of the sprocket 1 with the chain 10.

The sprocket 1 has a thickness approximately half of that of a typical sprocket known in the art, but enables proper engagement of the sprocket with the conventional chain. It requires only half the amount of material to make a conventional sprocket and eliminates the need for openings to reduce the weight of the sprocket. The sprocket 1 has a wavy periphery. This contour provides a higher degree of torsional strength and rigidity to the entire sprocket 1. The wavy region 2 has a plurality of grooves 2a along which mud and the like, as attached to the sprocket, is discharged. The grooves 2a prevent damage to the sprocket 1 and the chain 10 which may occur when mud and the like exist between the sprocket 1 and the chain 10.

Reference will now be made to other embodiments of the sprocket 1. Like parts are given like reference numerals and will not be described herein.

Figure 6:
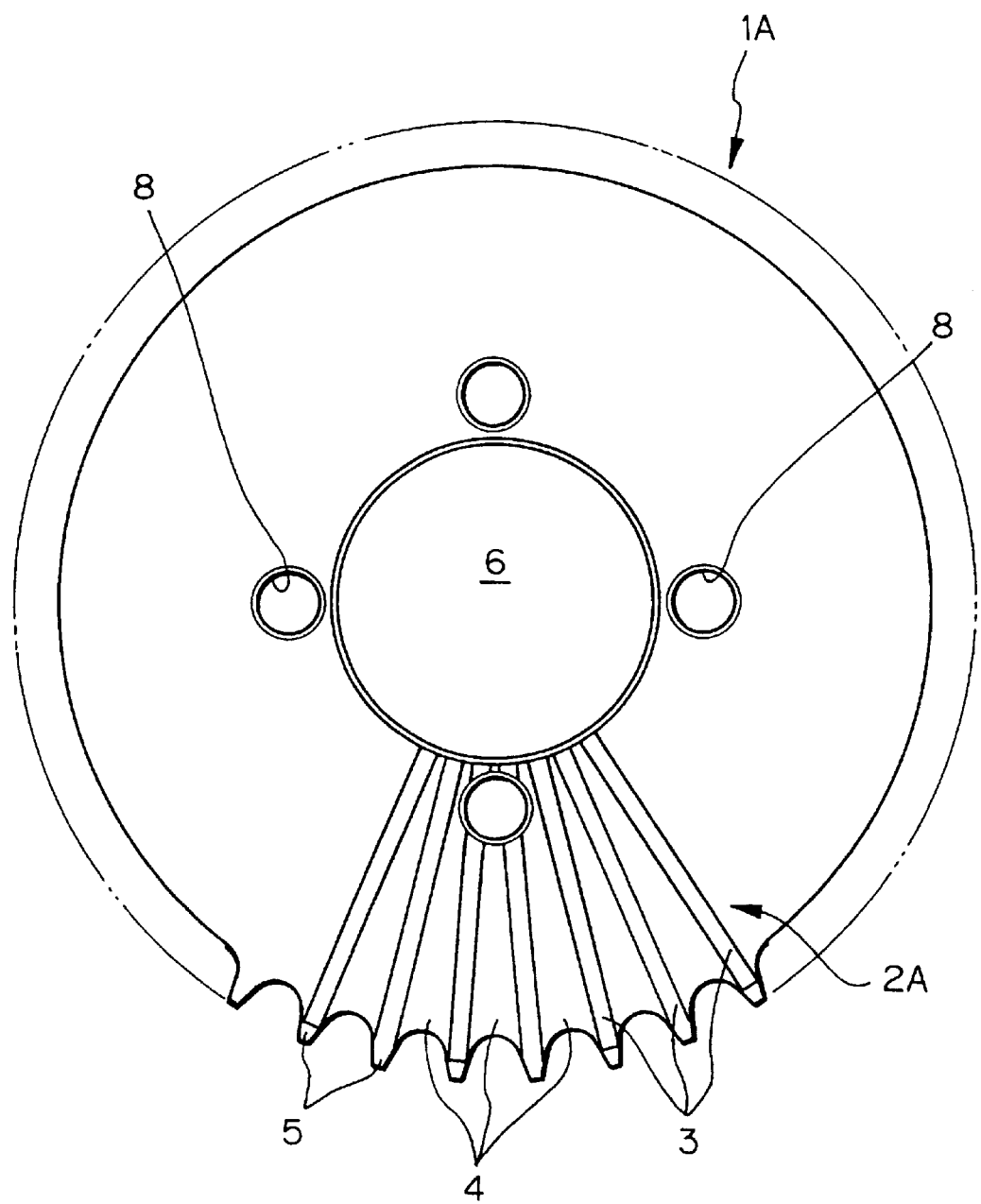
FIG. 6 is a front view of another embodiment of the sprocket.
Figure 7:
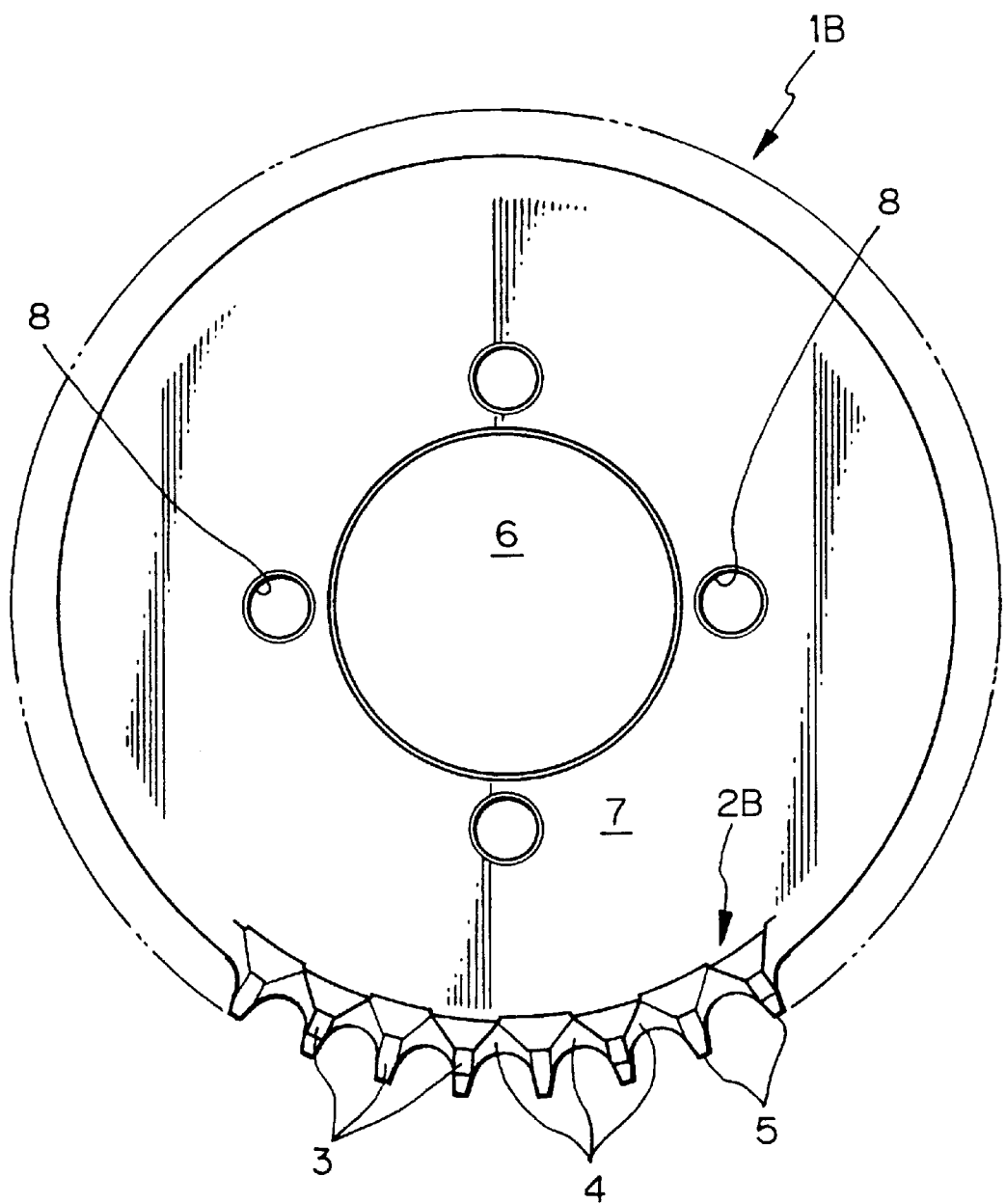
FIG. 7 is a front view of a further embodiment of the sprocket.

(1) Referring to FIG. 6, a sprocket 1A includes a wavy region 2A which extends between the outer periphery of the sprocket 1A and the opening 6. Referring to FIG. 7, a sprocket 1B includes a wavy region 2B which is formed only at the outer periphery of the sprocket 1B.

Figure 8:
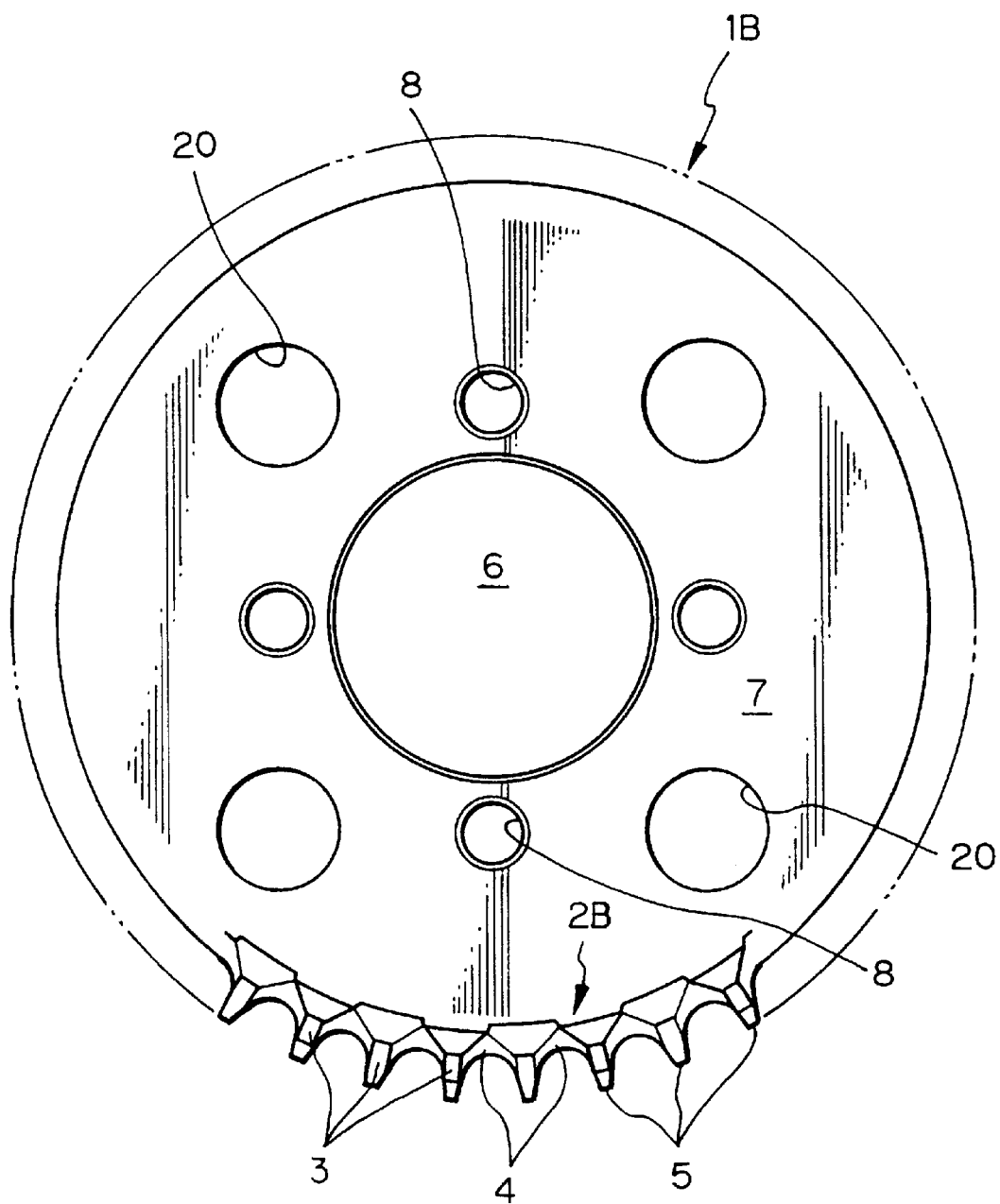
FIG. 8 is a front view of a still further embodiment of the sprocket.
Figure 9:
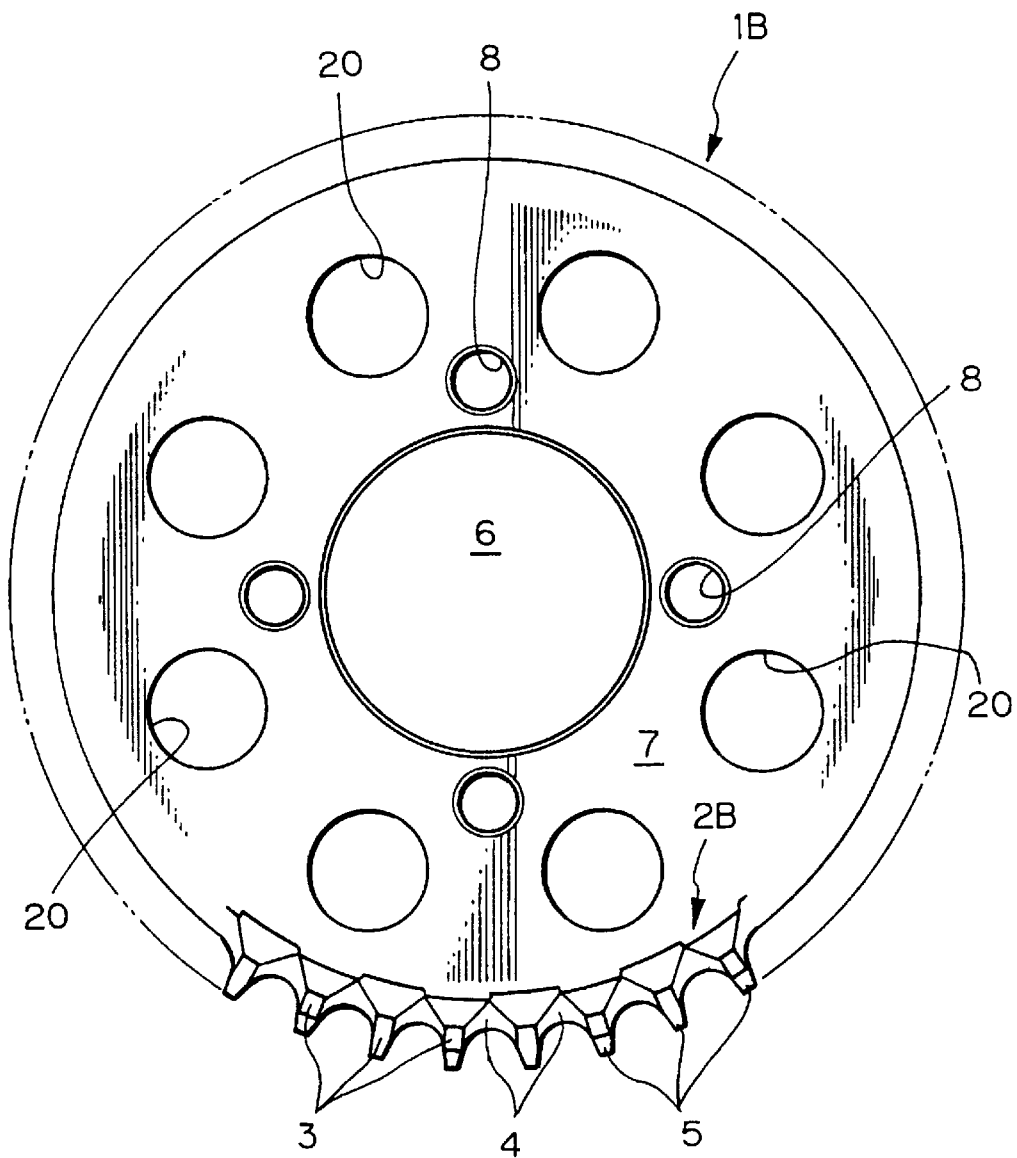
FIG. 9 is a front view of a different embodiment of the sprocket.
Figure 10:
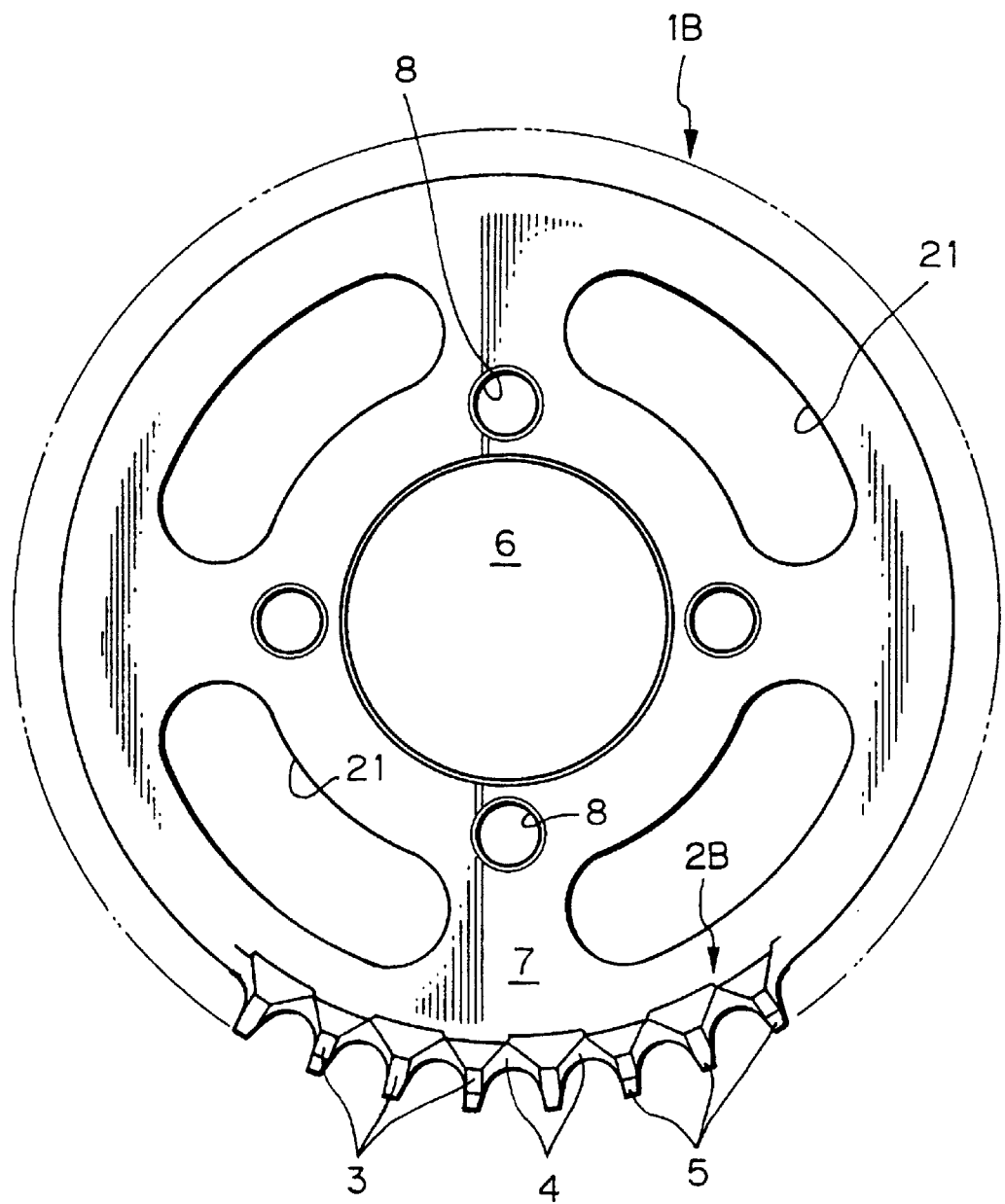
FIG. 10 is a front view of another embodiment of the sprocket.
Figure 11:
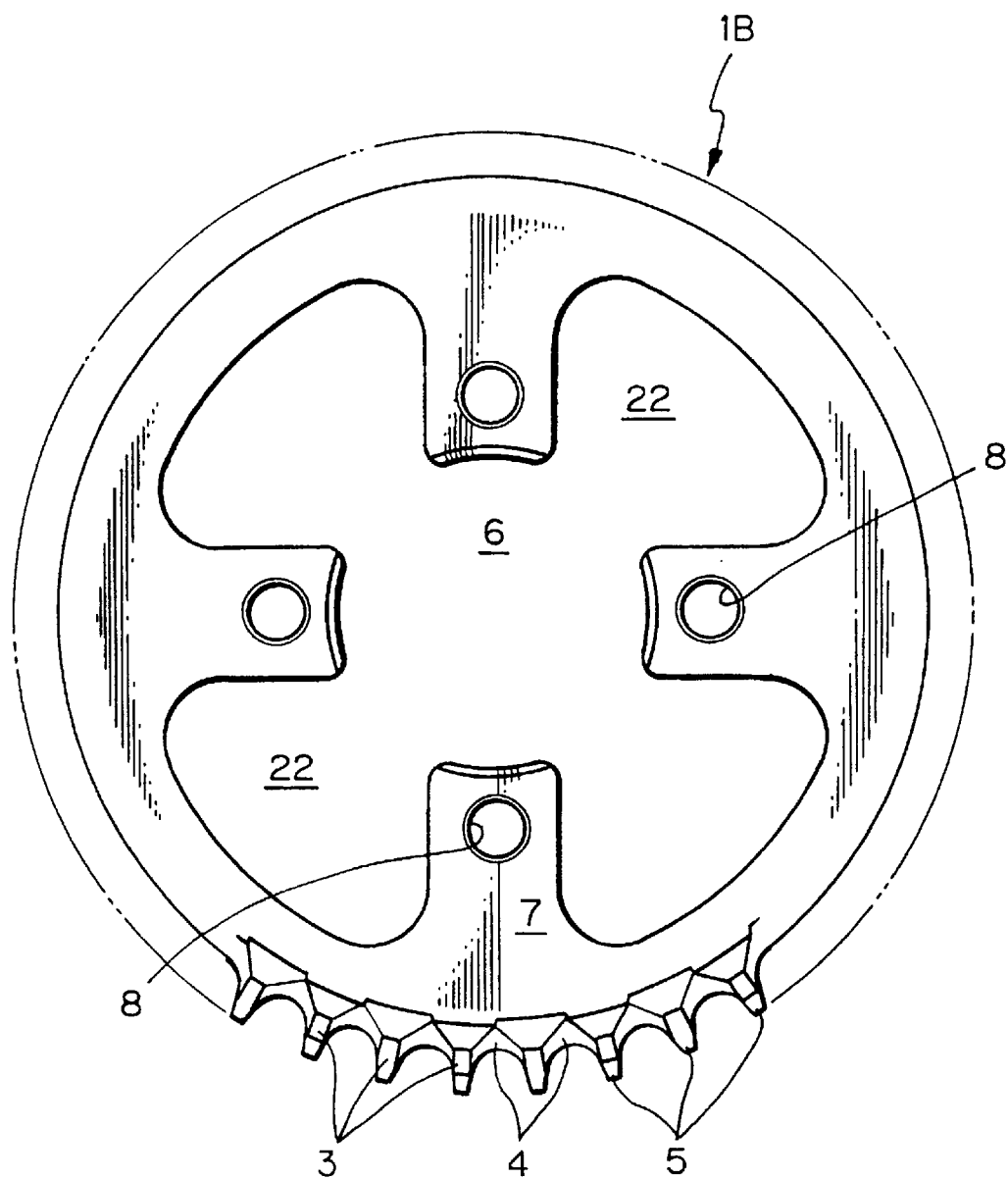
FIG. 11 is a front view of a further embodiment of the sprocket.

(2) The sprocket 1B may have four and eight openings to reduce its weight as shown in FIGS. 8 and 9, respectively. The sprocket 1B may alternatively have four oblong openings 21 as shown in FIG. 10. Still alternatively, the sprocket 1B may have four openings connected to the central opening 6 as shown in FIG. 11. The openings may take various other forms to reduce the weight of the sprocket 1B. Although not shown in the drawings, the sprocket 1 may also have various openings formed only in the wavy region 2 or both in the wavy region 2 and the annular body 7 to reduce its weight, unless they cause a reduction in the strength of the teeth 5. Similarly, the sprocket 1A may have circular, oblong or other openings formed in the wavy region 2A.

Figure 12:
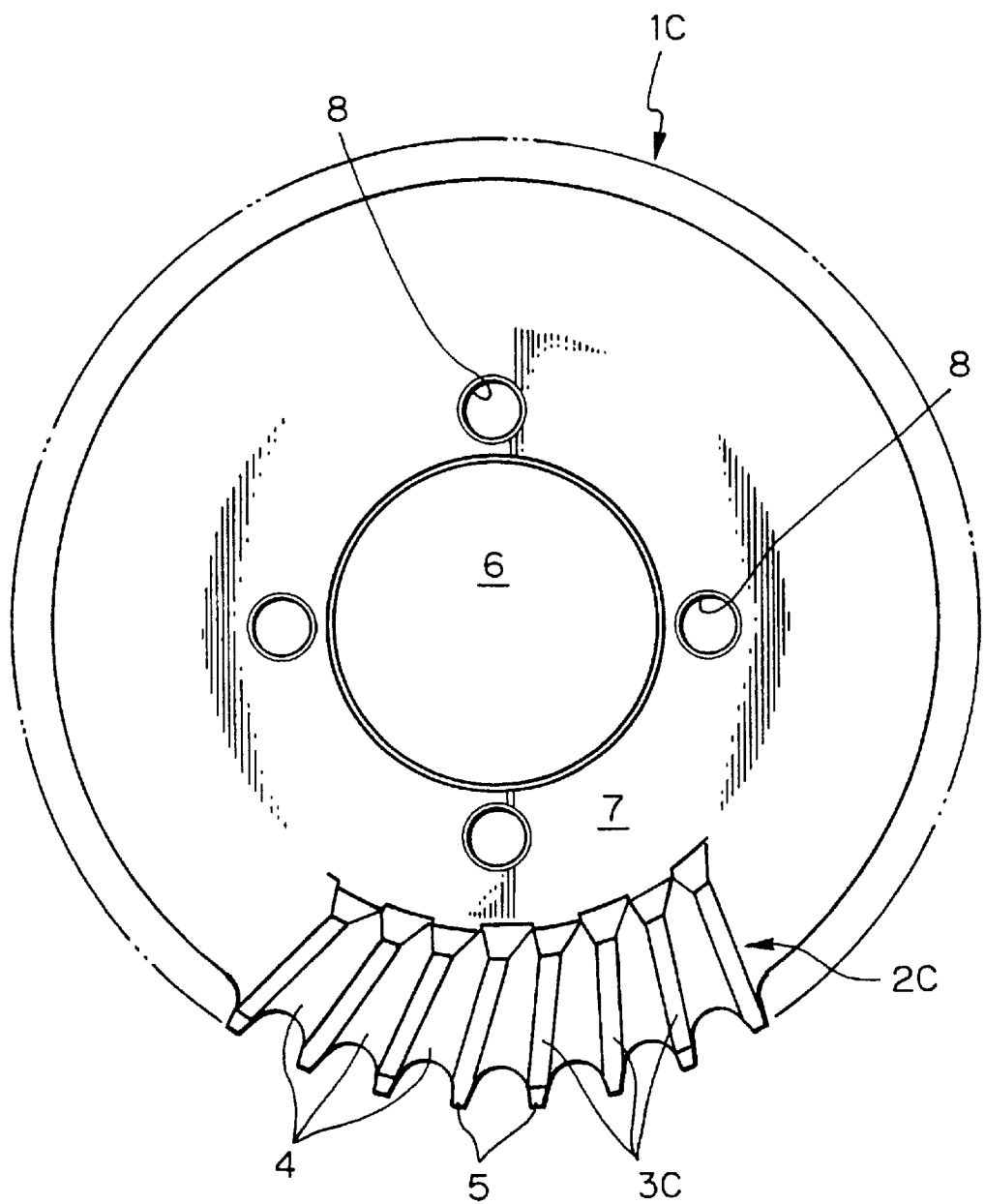
FIG. 12 is a front view of a still further embodiment of the sprocket.
Figure 13:
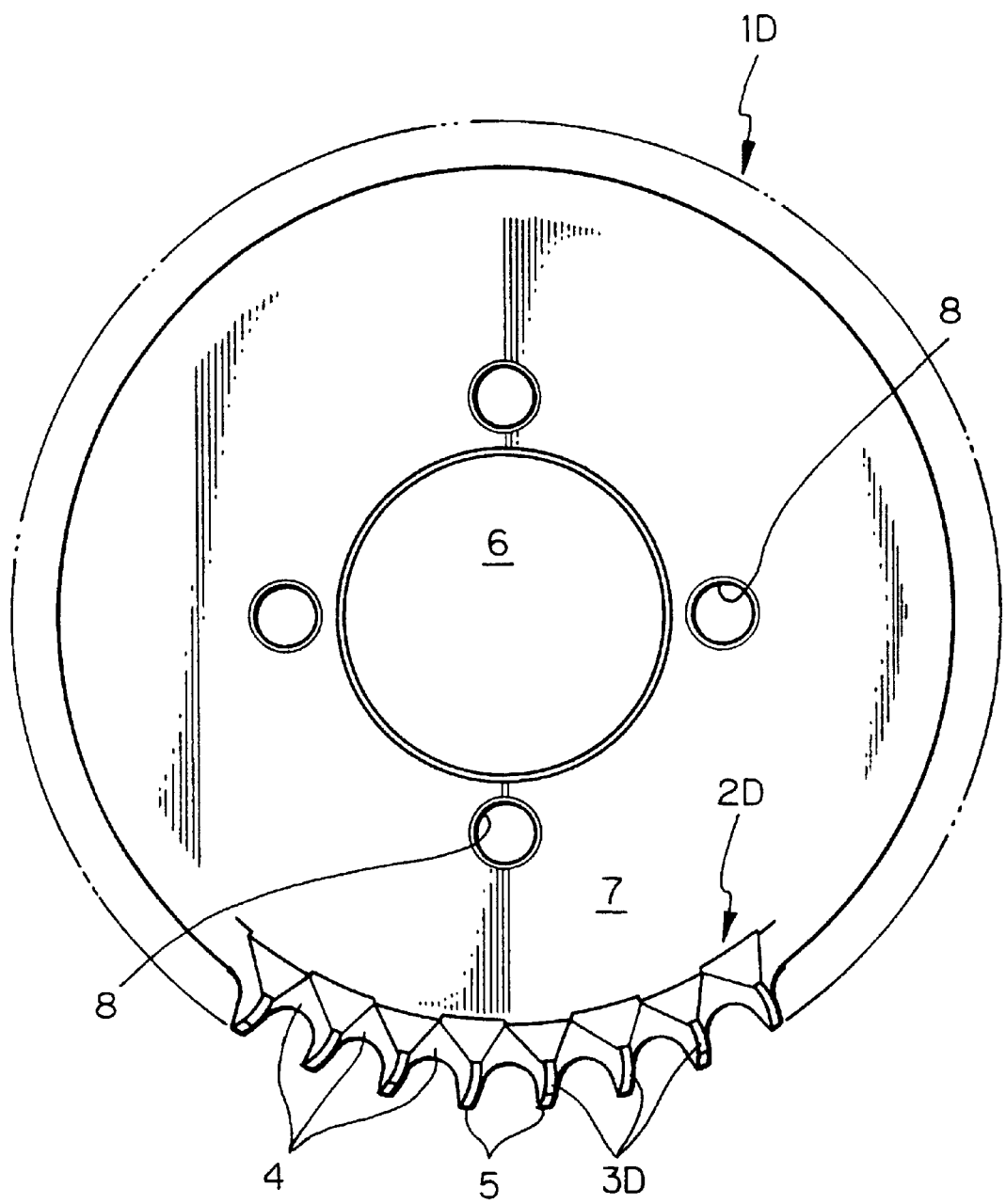
FIG. 13 is a front view of a different embodiment of the sprocket.

(3) The convex joint portions 3 of the wavy region 2 extend radially of the sprocket 1, but the invention is not limited thereto. Referring to FIG. 12, a sprocket 1C includes a wavy region 2C wherein a plurality of convex joint portions 3C extend in a direction transverse to the radial direction of the sprocket 1C. Similarly, the sprockets 1A and 1B may also have inclined convex joint portions. The convex joint portions 3 of the wavy region 2B extend radially of the sprocket 1B. As shown in FIG. 13, a sprocket 1D includes a wavy region 2D wherein a plurality of convex joint portions 3D extend in a curved fashion. Similarly, the convex joint portions 3 of the sprockets 1 and 1A may also extend in a curved fashion.

Figure 14:
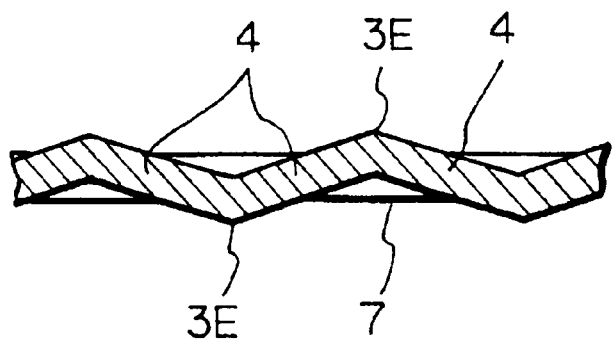
FIG. 14 is a sectional view similar to that of FIG. 3, but showing another embodiment of the sprocket.
Figure 15:
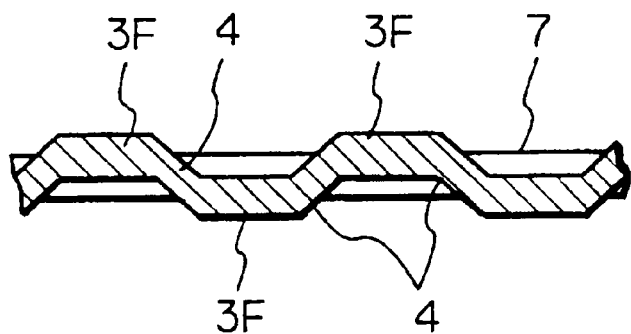
FIG. 15 is a sectional view similar to that of FIG. 3, but showing a further embodiment of the sprocket.

(4) In the sprockets 1 and 1A to 1D, the convex joint portions 3 are flat. Referring to FIG. 14, the convex joint portions 3E may be bent. As shown in FIG. 15, the convex joint and adjacent portions are flat so that the teeth 5 are in the form of a flat plate. Also, the wavy regions 2 and 2A to (incline with respect to) 2D may have a longer pitch so that the teeth 5 may be formed at the outer end of the slant portions 4. Referring to FIG. 15, a set of adjacent teeth 5 are connected to form a top portion 3F.

Figure 16:
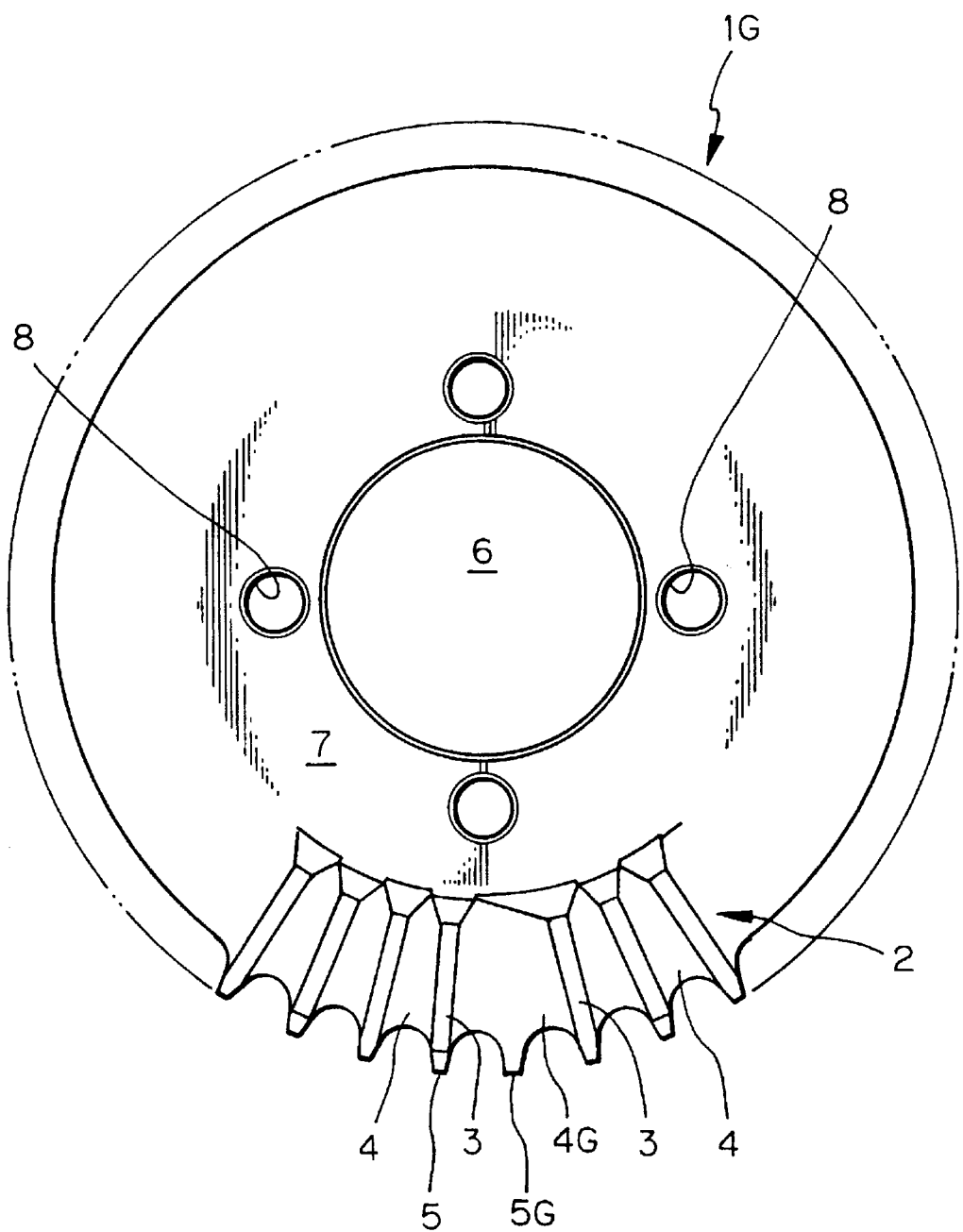
FIG. 16 is a front view of a still further embodiment of the sprocket.
Figure 17:
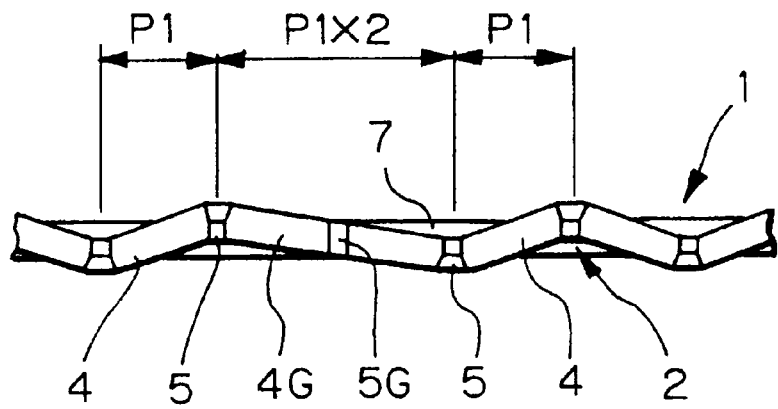
FIG. 17 is a view showing the teeth of the sprocket shown in FIG. 16.
Figure 18:
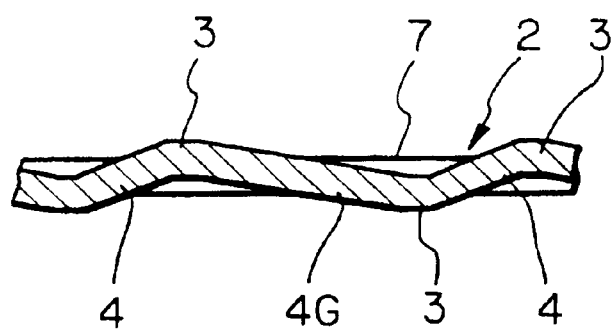
FIG. 18 is a sectional view similar to that of FIG. 3, but showing the teeth of the sprocket shown in FIG. 16.

(5) In the sprockets 1 and 1A to 1D, the wavy regions have a fixed pitch to provide an even number of teeth. In the wavy region 2 of a sprocket 1G shown in FIGS. 16 to 18, at least one pitch between adjacent convex joint portions 3 is two times greater than the other pitches P1. In other words, the number of convex joint portions in the sprocket 1G is less than that of the other sprockets by at least one. In the sprocket 1G, a tooth 5G is formed at the outer edge of a slant portion 4G between the convex joint portions 3. Where an even number of slant portions 4G are provided, the sprocket 1G has an even number of teeth. Where an odd number of slant portions 4G are provided, the sprocket 1G has an odd number of teeth. It should be noted that where the sprocket 1G is provided with a plurality of slant portions 4G, the slant portions 4G are preferably arranged in a circumferentially fixed relationship. Similarly, the sprockets 1A to 1D may be provided with an odd number of teeth by eliminating at least one convex joint portion, forming one tooth at the outer edge of the slant portion and then, providing an odd number of slant portions.

Figure 19:
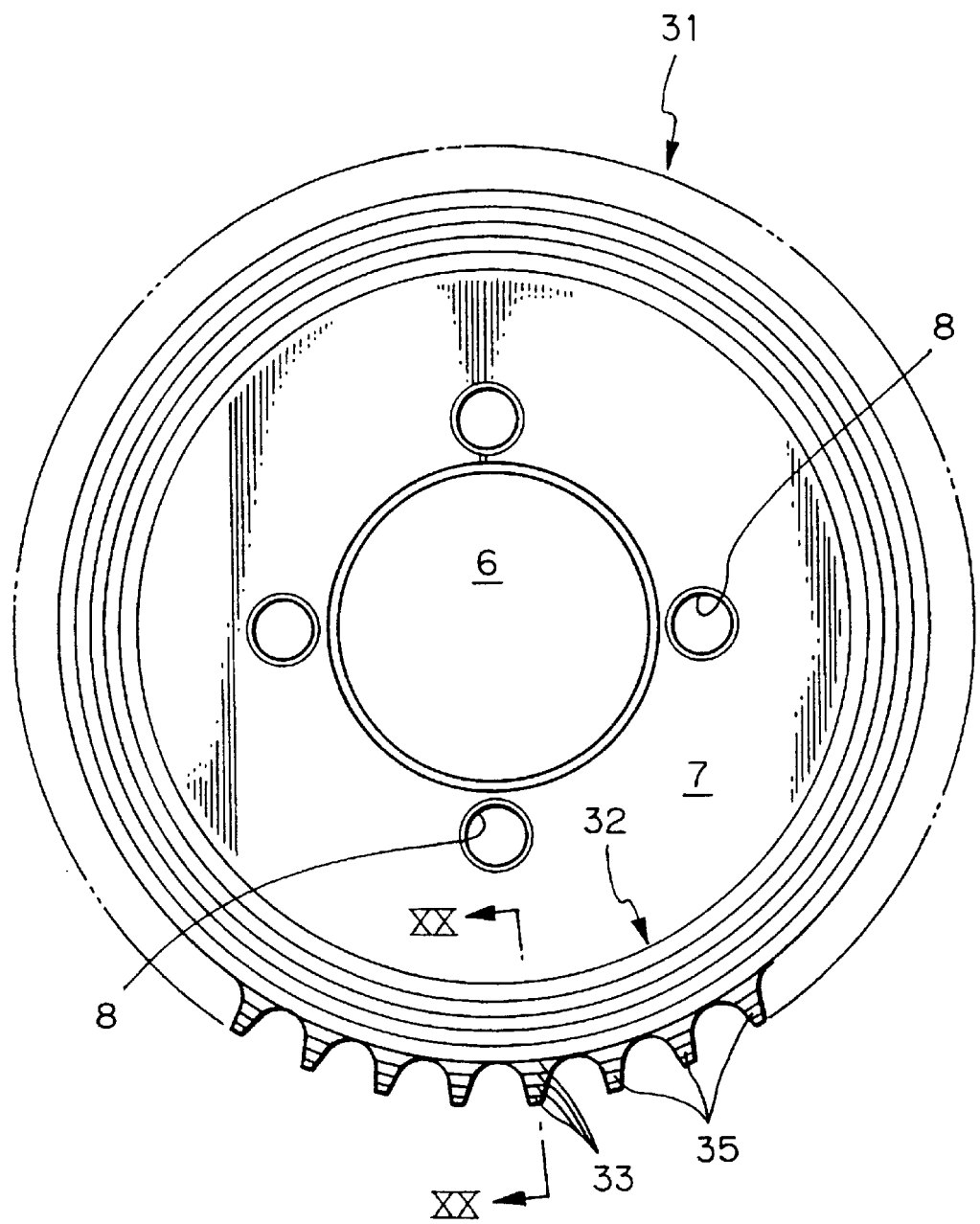
FIG. 19 is a front view of another embodiment of the sprocket.
Figure 20:
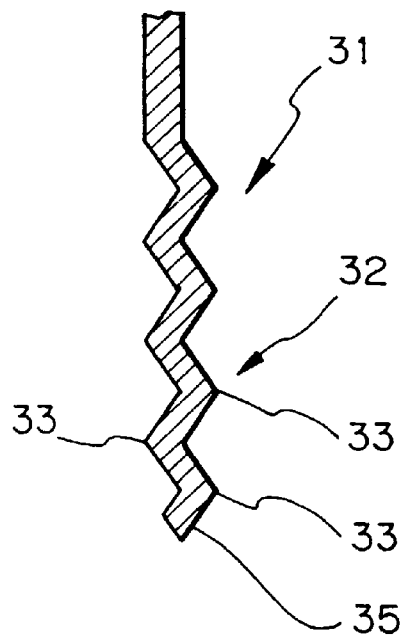
FIG. 20 is a sectional view taken on the line XX—XX in FIG. 19.
Figure 21:
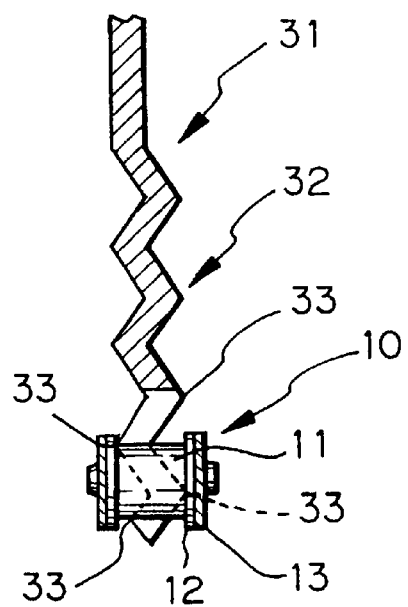
FIG. 21 is a view showing the manner in which the sprocket shown in FIG. 19 is engaged with an associated chain.

(6) Referring to FIGS. 19 and 20, a sprocket 31 includes an annular wavy region 32 formed at least at its outer periphery. The wavy region 32 radially extends in an undulating fashion with a fixed pitch. The wavy region 32 has a plurality of teeth 35 at its outer periphery. As shown in FIG. 21, opposed roller link plates 12 extend between two adjacent convex joint portions 33 to insure proper engagement of the sprocket 31 with the chain 10. The wavy region 32 is located at the outer periphery of the sprocket, but may extend over any other part of the sprocket 31.

Figure 22:
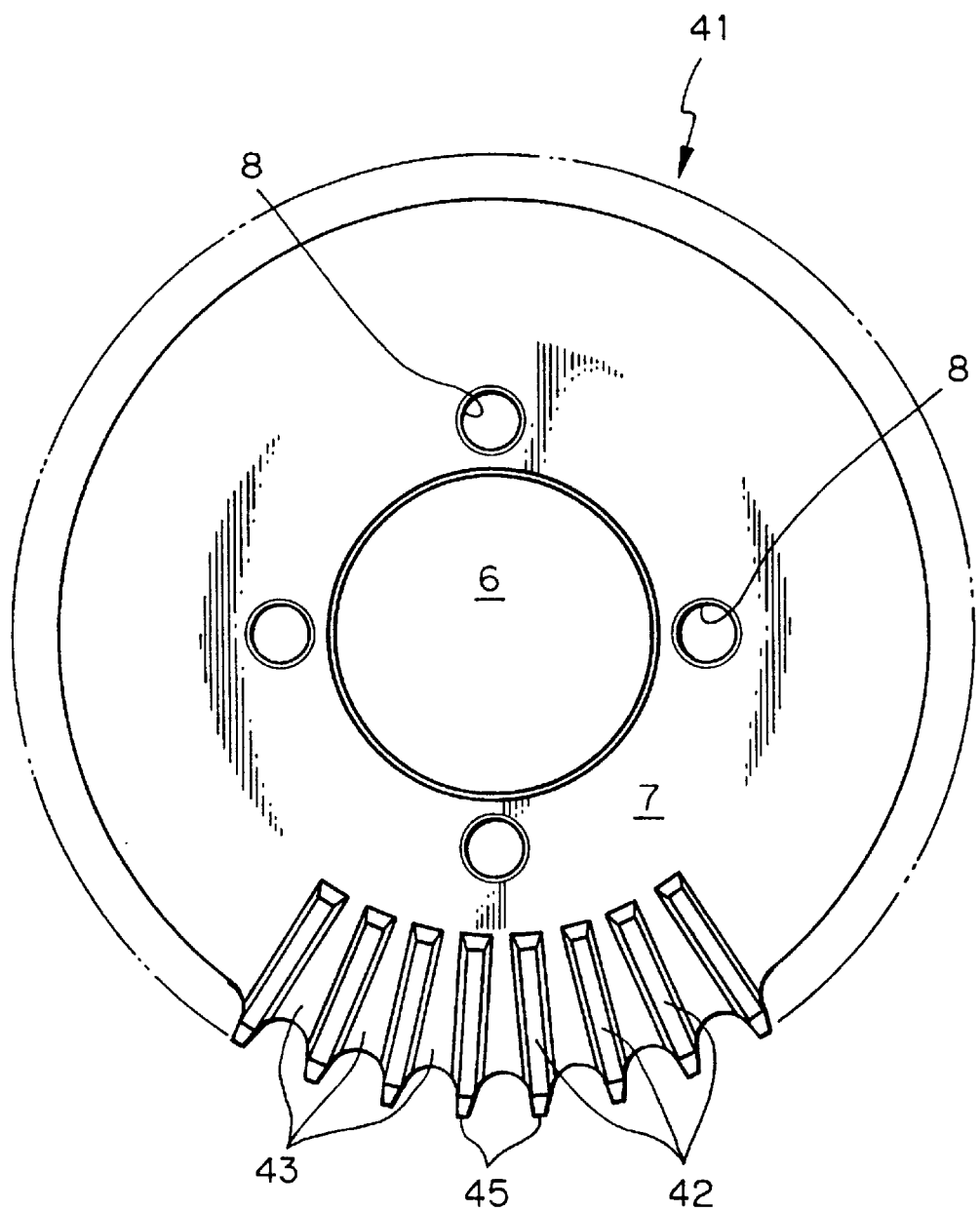
FIG. 22 is a front view of another embodiment of the sprocket.
Figure 23:
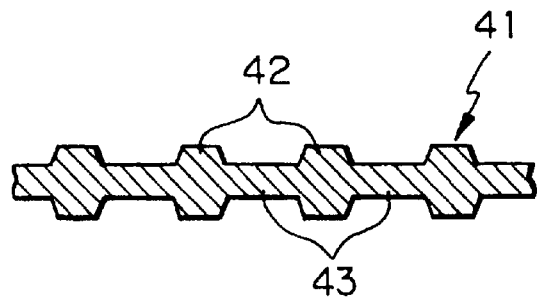
FIG. 23 is a sectional view similar to that of FIG. 3, but showing the teeth of the sprocket shown in FIG. 22.
Figure 24:
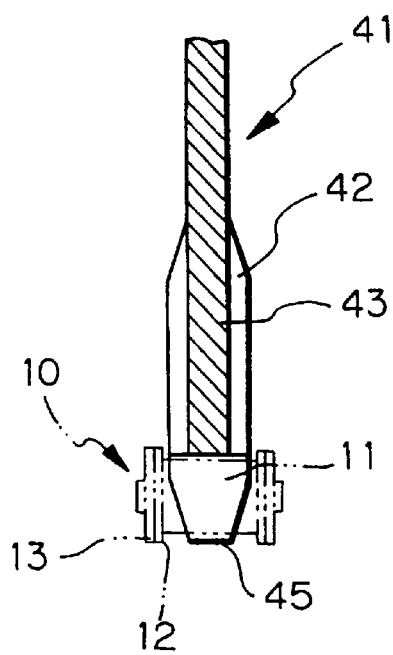
FIG. 24 is a view showing the manner in which the sprocket shown in FIG. 22 is engaged with an associated chain.
Figure 25:
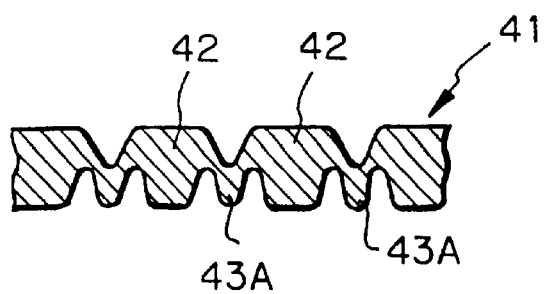
FIG. 25 is a sectional view similar to that of FIG. 3, but showing the teeth of a sprocket according to another embodiment.

(7) Referring to FIGS. 22 and 23, a sprocket 41 includes thick portions 42 and thin portions 43. The thick portions 42 and the thin portions 43 are formed at least at its outer periphery and alternately arranged along the circumference of the sprocket 41. A plurality of teeth 45 are formed at the outer end of the thick portions 42. Referring to FIG. 24, each of the teeth 45 is engaged with the roller 11 along the entire length of the roller 11, as is conventional, to insure engagement of the sprocket 41 and the chain 10. As shown in FIG. 25, the sprocket 41 may have thin wavy portions 43A. Also, the thick portions 42 may extend radially in an inclined or curved fashion as in the sprockets 1C and 1D.

Figure 26:
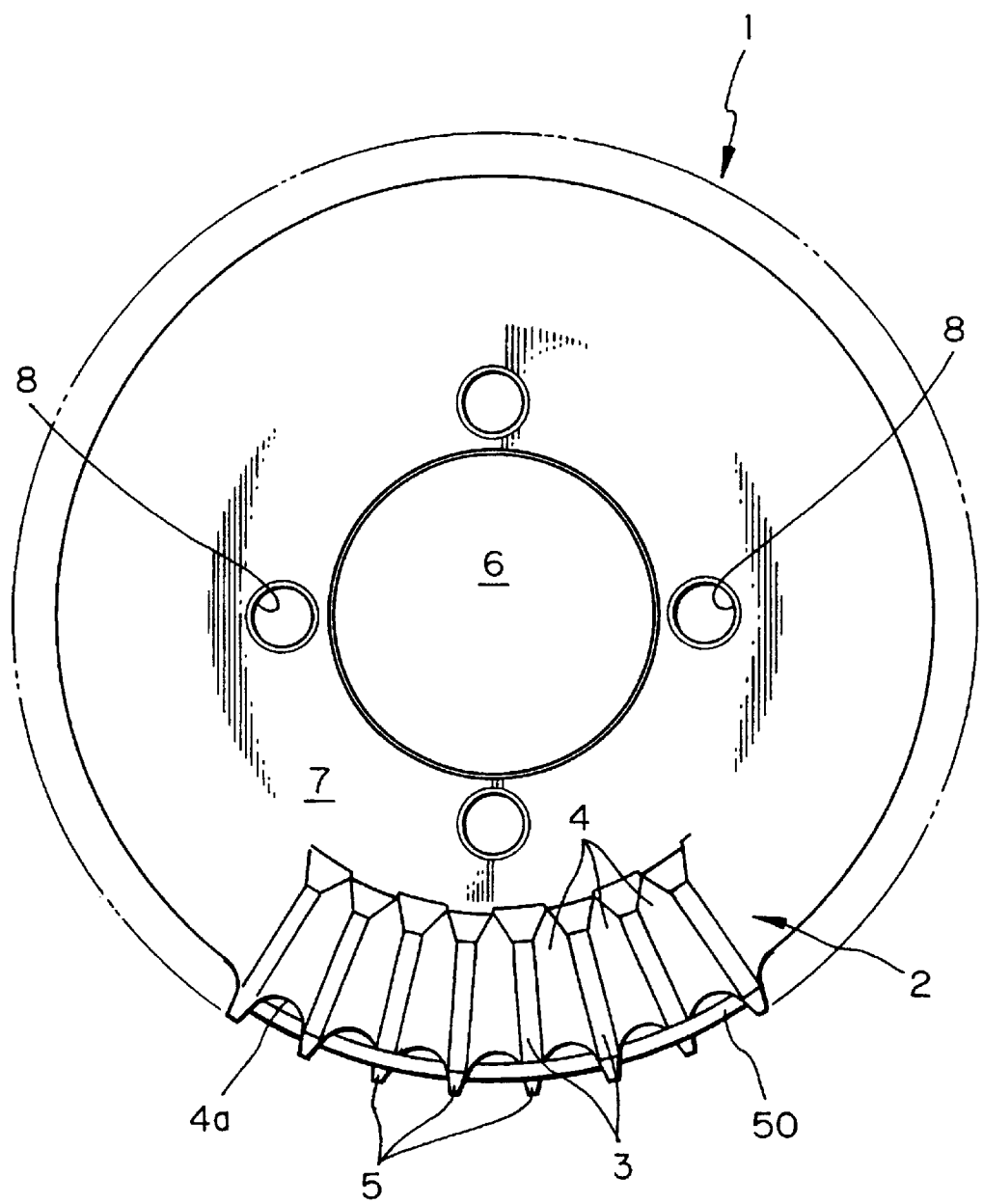
FIG. 26 is a front view of another embodiment of the sprocket with the means for reducing noise.

The sprockets may also be provided with a means for reducing noise which may occur due to contact between the sprockets and the chain. Referring specifically to FIG. 26, a flexible and resilient or elastic annular cushion element 50 may extend around the sprocket 1 shown in FIG. 1. The cushion element 50 is forced to extend alternately between the teeth adjacent to the roots 4a. The cushion element 50 is secured to the sprocket by an adhesive. With the cushion element 50 provided adjacent to the roots 4a, the rollers 11 of the chain 10 contact with the cushion element 50 during engagement of the sprocket with the chain 10 to eliminate the occurrence of noise.

Figure 27:
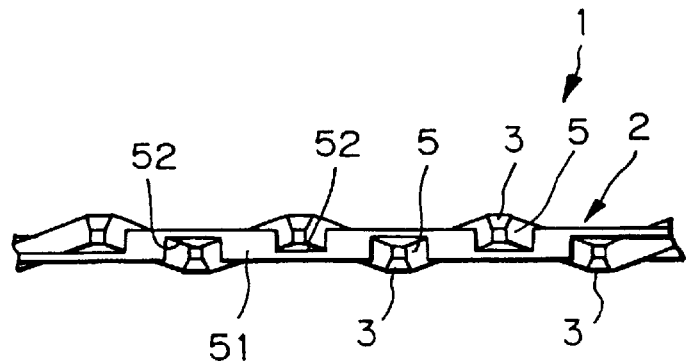
FIG. 27 is a side view, partly on an enlarged scale, of another embodiment of the sprocket of FIG. 26.

In the embodiment shown in FIG. 26, the cushion element 50 is in the form of a ring. Referring to FIG. 27, a cushion element 51 may have recesses 52 to receive the teeth 5. This arrangement retards deformation of the cushion element 51 when disposed around the sprocket. In this case, the cushion element 51 can be made of not only rubber, but also non-flexible resin. The recesses 52 may have a shape complementary to that of the teeth 52 so as to eliminate any clearance between the teeth 5 and the cushion element. Also, the cushion element may have a shape complementary to that of the wavy region of the sprocket so as to eliminate any clearance between the teeth and the cushion element.

Figure 28:
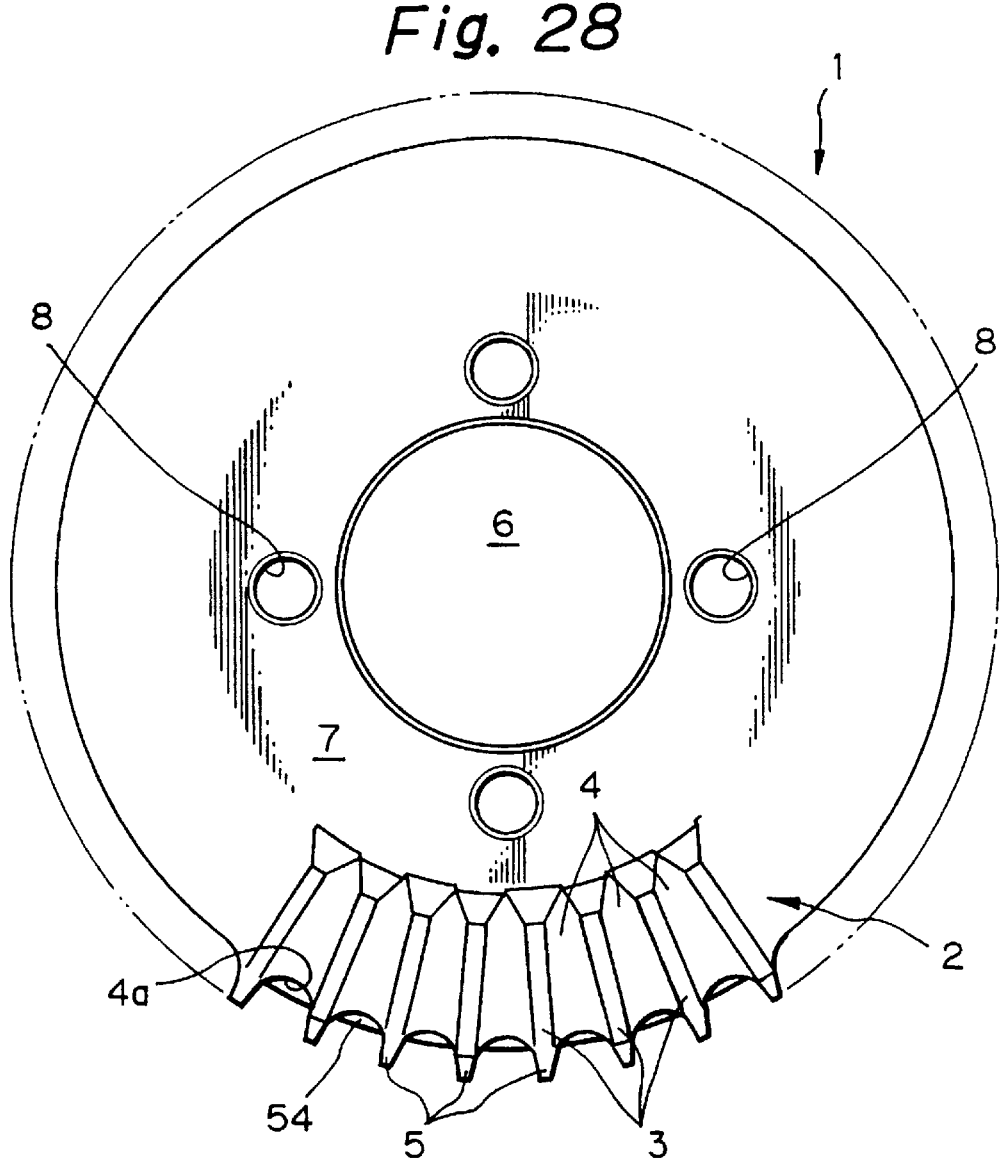
FIG. 28 is a front view of a further embodiment of the sprocket with the means for reducing noise.
Figure 29:
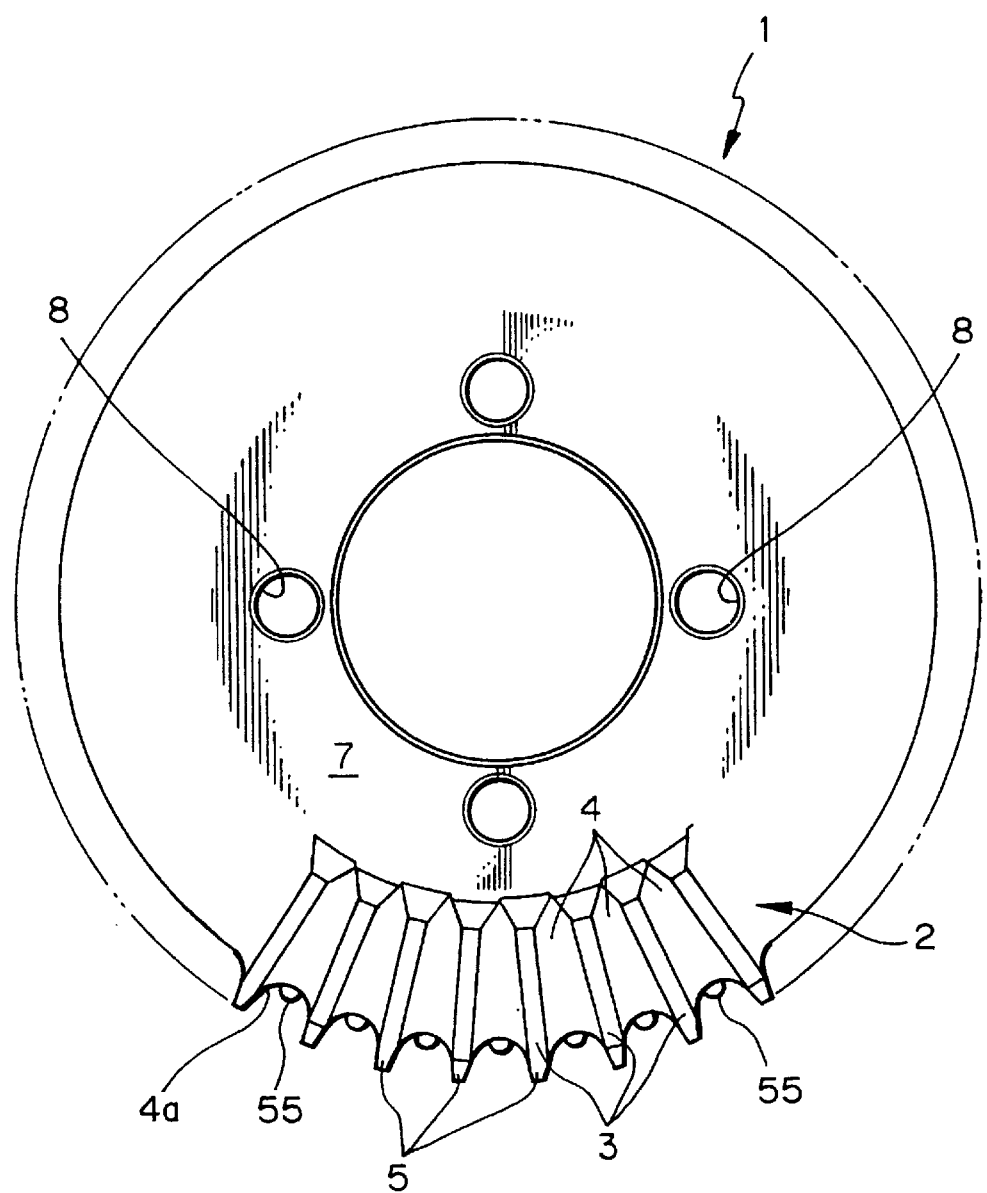
FIG. 29 is a front view of a still further embodiment of the sprocket with the means for reducing noise.

In the embodiments shown in FIGS. 26 and 27, the cushion elements are in the form of rings. Alternatively, a plurality of cushion elements 54 may separately be mounted to the roots 4a. In FIG. 28, the cushion elements 54 extend over the roots 4a. Alternatively, a plurality of cushion elements 55 may be located in a part of the roots 4a as shown in FIG. 29.

Figure 30:
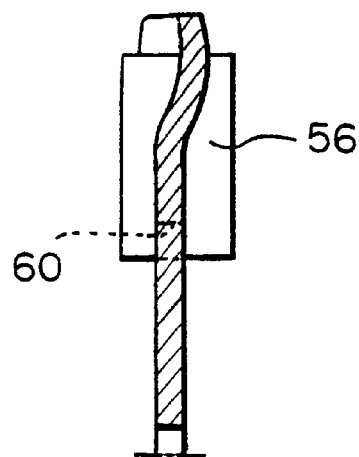
FIG. 30 is a partial sectional view of another embodiment of the sprocket of FIG. 29 with the means for reducing noise.

Referring to FIG. 30, a sprocket has a plurality of through-holes 60 adjacent to the roots. A plurality of cushion elements 56 extend through the holes 60 and are interconnected together so that the cushion elements 56 are disposed adjacent to the roots.

Figure 31:
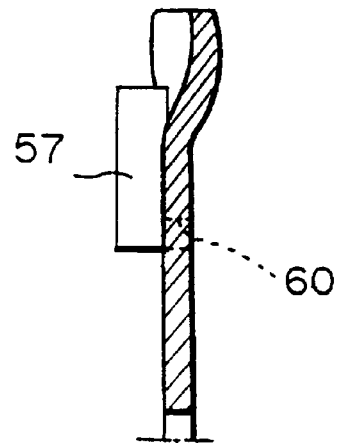
FIG. 31 is a partial sectional view of a further embodiment of the sprocket with the means for reducing noise.

Referring to FIG. 31, a cushion element 57 is disposed on one side of each of the roots 4a rather than directly in the roots 4a. In this case, the cushion elements 57 are partly forced into the through holes 60 so that they are secured to the sprocket. The cushion elements 57 may alternatively be attached to the sprocket by an adhesive.

Figure 32:
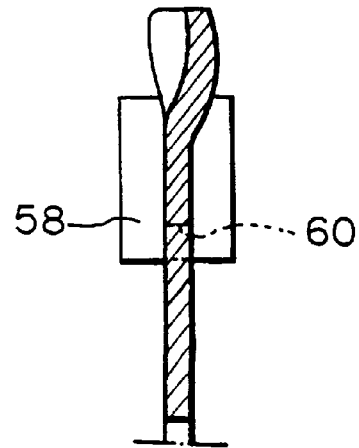
FIG. 32 is a partial sectional view of a still further embodiment of the sprocket with the means for reducing noise.

Referring to FIG. 32, a plurality of cushion elements 58 are attached to opposite sides of each of the roots 4a. Like the embodiment shown in FIG. 30, these cushion elements 58 extend through the through holes 60 and are interconnected together so as to be secured to the sprocket. Discrete cushion elements may be attached to the sprocket by an adhesive.

Preferably, the cushion elements extend around the roots. The cushion elements may alternatively extend from the roots to the inner ends of the grooves 2a.

INDUSTRIAL APPLICABILITY

The sprocket according to the present invention comprises a wavy region formed at least at its outer periphery, and a plurality of teeth formed at least at the outer end of convex joint portions of the wavy region. The sprocket is simple in structure and is easily made by a press machine or a forging technique. The sprocket thus made is maintained in proper engagement with an associated chain. Advantageously, the thickness of the sprocket can be reduced according to the strength of a chain so as to reduce the weight of the sprocket. Also, the wavy region which is formed at least at the outer periphery of the sprocket provides a sufficient degree of torsional strength and rigidity to the entire sprocket. Advantageously, the wavy region promotes the flow of air so as to effectively cool down the sprocket and prevent thermal deformation of the sprocket. Mud and other foreign substances, which may be attached to the sprocket, is caused to smoothly flow out of the sprocket without remaining between the sprocket and the chain, thereby preventing damage to the sprocket and the chain. The sprocket can have an odd number of teeth.

The sprocket according to the present invention comprises a wavy region formed at least at its outer periphery, and a plurality of teeth formed at the outer periphery of the wavy region. The sprocket is simple in structure and is easily made by a press machine or a forging technique. The sprocket thus made is maintained in proper engagement with an associated chain. Advantageously, the thickness of the sprocket can be reduced according to the strength of a chain so as to reduce the weight of the sprocket. Also, the wavy region which is formed at least at the outer periphery of the sprocket provides a sufficient degree of torsional strength and rigidity to the entire sprocket. Mud and other foreign substances, which may be attached to the sprocket, is caused to smoothly flow out of the sprocket, thereby preventing damage to the sprocket and the chain.

The sprocket according to the present invention comprises thick and thin portions formed at its outer periphery and arranged alternately along the circumference of the sprocket, and a plurality of teeth formed at the outer end of the thick portions. The sprocket is simple in structure and is easily made by a press machine or a forging technique. The sprocket thus made is maintained in proper engagement with a chain while the weight of the sprocket can readily be reduced. The alternate arrangement of the thin and thick portions provides a sufficient degree of torsional strength and rigidity to the entire sprocket. Mud and other foreign substances which may be attached to the sprocket are caused to smoothly flow out of the sprocket, thereby preventing damage to the sprocket as well as the chain.

In its preferred form, there is provided a means for reducing noise arising from contact between the sprocket and an associated chain. The means for reducing noise is mounted to roots formed between adjacent teeth. The means for reducing noise comprises a cushion element. The cushion element can be made of not only rubber, but also elastic resin or elastic plastic. The cushion element may damp and eliminate the occurrence of noise during engagement of the sprocket with the chain.

What is claimed is:

1. A sprocket comprising:

a plurality of convex joint portions;

a plurality of slant portions, each of said slant portions being located between separate pairs of adjacent convex joint portions so as to form a wavy region at a periphery of the sprocket, said wavy region extending around a circumference of the sprocket in an undulating shape;

a plurality of teeth located at an outer end of said convex joint portions and a tooth located at an outer end of said slant portions; and an annular resilient element for reducing noise arising from contact between said sprocket and a chain, said annular resilient element extending along said plurality of teeth such that a portion of said annular resilient element is positioned in roots formed between adjacent teeth;

wherein said plurality of convex joint portions includes a group of pairs of adjacent convex joint portions having a first pitch and includes at least one pair of convex joint portions having a second pitch, said first pitch being different than said second pitch.

2. A sprocket comprising:

a plurality of convex joint portions;

a plurality of slant portions, each of said slant portions being located between separate pairs of adjacent convex joint portions so as to form a wavy region at a periphery of the sprocket, said wavy region extending around a circumference of the sprocket in an undulating shape;

a plurality of teeth located at an outer end of said convex joint portions and a tooth located at an outer end of said slant portions, wherein roots are formed between adjacent teeth, and through-holes are formed at said roots; and a plurality of cushion elements for reducing noise arising from contact between said sprocket and a chain, said cushion elements extending through said through-holes and being arranged around said roots;

wherein said plurality of convex joint portions includes a group of pairs of adjacent convex joint portions having a first pitch and includes at least one pair of convex joint portions having a second pitch, said first pitch being different than said second pitch.

3. A sprocket comprising:

a plurality of convex joint portions;

a plurality of slant portions, each of said slant portions being located between pairs of adjacent convex joint portions so as to form a wavy region at a periphery of the sprocket, said wavy region extending around a circumference of the sprocket in an undulating shape; and a plurality of teeth, one of said teeth being formed at an outer end of each of said convex joint portions;

wherein said plurality of convex joint portions includes a group of pairs of adjacent convex joint portions having a first pitch, and includes at least one pair of adjacent convex joint portions having a second pitch, said first pitch being different than said second pitch; and wherein at least one of said teeth is located between said at least one pair of convex joint portions having said second pitch.

4. The sprocket of claim 3, further comprising a central opening, wherein said wavy region extends between said central opening and said periphery of the sprocket.

5. The sprocket of claim 3, wherein said wavy portion is located only at said periphery of the sprocket.

6. The sprocket of claim 3, further comprising a plurality of holes arranged to reduce a weight of the sprocket.

7. The sprocket of claim 3, wherein said convex joint portions extend radially with respect to the sprocket.

8. The sprocket of claim 3, wherein said convex joint portions are inclined relative to a radial direction of the sprocket.

9. The sprocket of claim 3, wherein said convex joint portions are curved.

10. The sprocket of claim 3, wherein said convex joint portions have flat surfaces.

11. The sprocket of claim 3, wherein said convex joint portions are bent.

12. The sprocket of claim 3, wherein each of said teeth are formed as flat plates.

13. The sprocket of claim 3, further comprising a noise reduction component for reducing noise arising from contact between said sprocket and a chain.

14. The sprocket as of claim 3, wherein said at least one of said teeth comprises an intermediate tooth, said intermediate tooth being located at an outer end of a slant portion located between said at least one pair of convex joint portions having said second pitch.

15. The sprocket of claim 3, wherein said second pitch is twice as large as said first pitch.

16. The sprocket of claim 3, wherein said teeth are arranged around said circumference of the sprocket such that all pairs of adjacent teeth have equal pitches.

17. The sprocket of claim 3, wherein each of said holes has a circular configuration.

18. The sprocket of claim 3, wherein each of said holes has an oblong configuration.

19. The sprocket of claim 3, further comprising a central opening, wherein said holes are connected to said central opening.

20. The sprocket of claim 13, wherein roots are formed between adjacent teeth, said noise reduction component being mounted to said roots.

21. The sprocket of claim 13, wherein said noise reduction component comprises a cushion element.

22. The sprocket of claim 13, wherein roots are formed between adjacent teeth, said noise reduction component being located adjacent to said roots.

23. The sprocket of claim 20, wherein said noise reduction component extends over said roots.

24. The sprocket of claim 20, wherein said noise reduction component is located in a portion of said roots.

25. The sprocket of claim 22, wherein said noise reduction component is located radially outward of said roots with respect to the sprocket.

26. The sprocket of claim 22, wherein said noise reduction component is located at a side of said roots.

27. The sprocket of claim 22, wherein said noise reduction component comprises portions located at opposing sides of said roots.

28. The sprocket of claim 22, wherein said noise reduction component comprises a cushion element.

29. The sprocket of claim 22, wherein said noise reduction component comprises an annular resilient element extending along said plurality of teeth such that a portion of said annular resilient element is positioned in roots formed between adjacent teeth.

* * * * *